C. W. WILLCOXSON.
Cotton-Planter Attachment.
No. 228,153. Patented May 25, 1880.
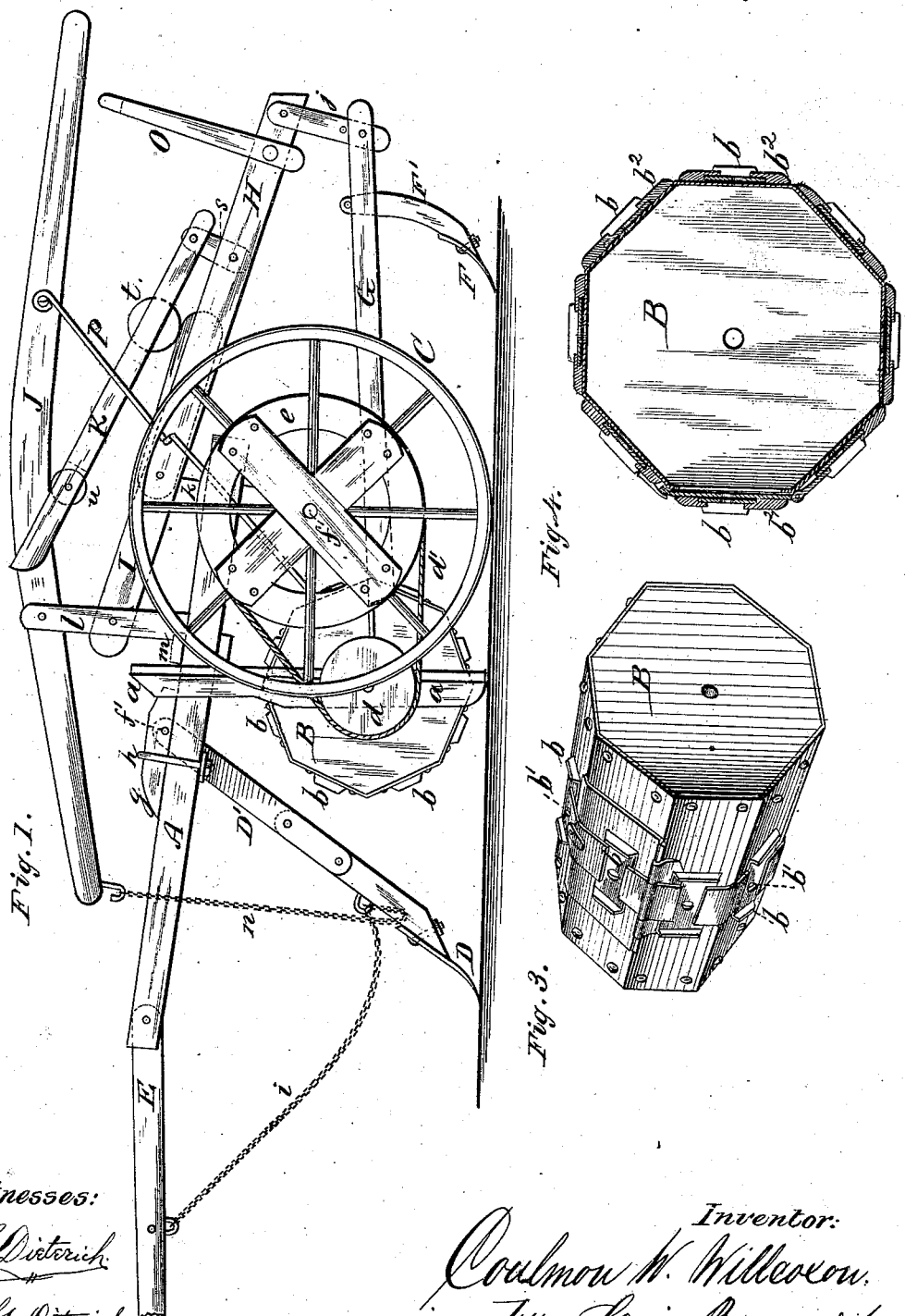

C. W. WILLCOXSON.
Cotton-Planter Attachment.
No. 228,153. Patented May 25, 1880.
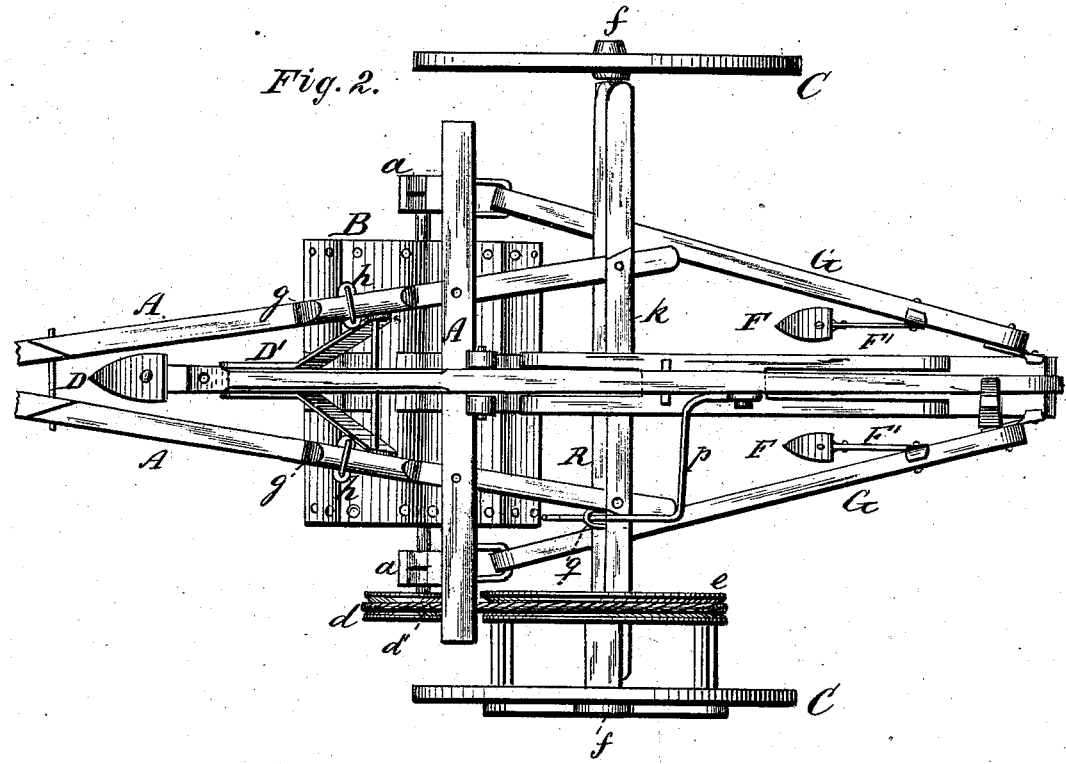
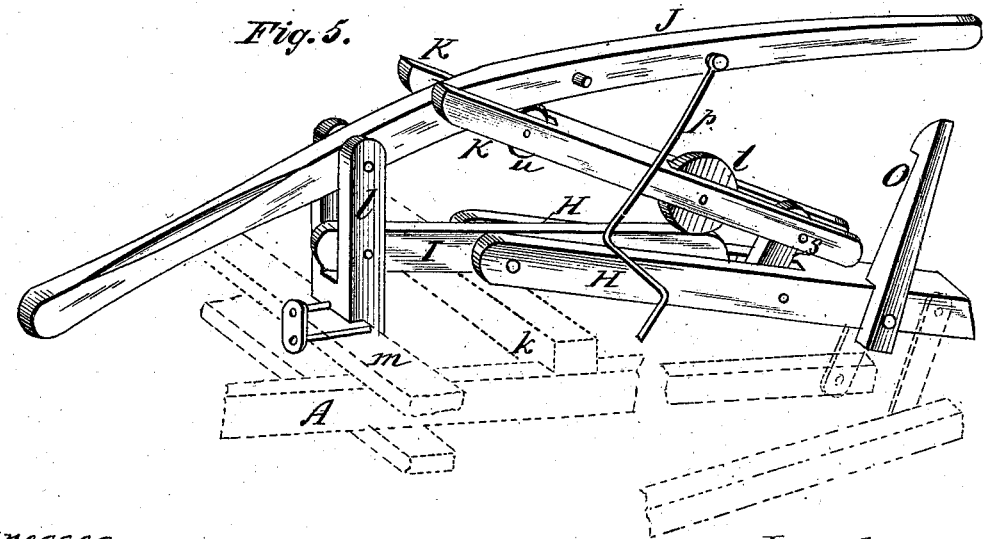

UNITED STATES PATENT OFFICE.

COULMON W. WILLCOXSON, OF FARMERSVILLE, TEXAS, ASSIGNOR OF ONE-HALF OF HIS RIGHT TO SAMUEL R. HAMILTON, OF SAME PLACE.

COTTON-PLANTER ATTACHMENT.

SPECIFICATION forming part of Letters Patent No. 228,153, dated May 25, 1880.

Application filed March 8, 1880. (No model.)

*To all whom it may concern:*

Be it known that I, COULMON W. WILLCOXSON, of Farmersville, county of Collin, and State of Texas, have invented new and useful Improvements in Cotton-Planters; and I do hereby declare that the following is a full, clear, and exact description of the invention, sufficient to enable others skilled in the art to which it appertains to make and use the same, reference being had to the accompanying drawings, and to the letters of reference marked thereon.

Figure 1 is a side elevation of my improved cotton or other planter. Fig. 2 is a plan view of the same. Figs. 3 and 4 are perspective and sectional views, respectively, of the seed-drum, and Fig. 5 is a perspective view of the plow-adjusting system of levers.

This invention has relation to improvements in cotton or other planters, which is simple and capable of being readily applied to various forms of wheel-cultivators, or even to the front axle and wheels of the running-gear of a vehicle, and is adapted to plant cotton and corn, and also the seed of garden or other vegetables.

To these ends my invention consists, among other features, of the method or mechanism for simultaneously adjusting—i. e., raising and lowering—the plows in front and in rear of the seed-dropping drum, substantially as hereinafter more fully set forth.

In the accompanying drawings, A marks the frame. It may be of the form or construction such as is common to any of those used in the various kinds of wheel-cultivators, or it may refer to the hounds and tongue of the front part of the running-gear of a vehicle, as my invention, as before intimated, is capable of being used with any of these, or with even as few parts as here named, as will presently appear.

B is a revolving hopper or drum, preferably of an octagonal shape, though capable of having any other suitable shape, which is hung at its ends or heads upon trunnions or a shaft between depending bars or uprights $a$, fastened at their upper ends to the frame A. These uprights or pendants $a$ extend down in close proximity to the ground, and support the frame or hounds, as the case may be, in an elevated position when at rest. In each of the eight sides of the drum or hopper is a seed-dropping opening, over which slides, so as to open or close it, a slide, $b$, with a coincident opening, $b'$, through it. These slides are guided and held in position by cleats $b^2$, fastened to the sides of the hopper. It is also provided with a door to permit the filling of the hopper.

Upon one end of the shaft, or rather upon one of the trunnions of the seed-drum or hopper, is a grooved pulley, $d$, around which passes an endless belt, $d'$, encompassing a similar pulley, $e$, upon the axle $f$ of the transporting and driving wheels C C. This arrangement transmits motion to the revolving hopper or drum, to cause it to drop its seed when the machine is in operation.

D is the forward shovel or plow, whose standard D' is bifurcated and hung at its upper end upon a cross-bar, $f'$, with its ends secured in blocks $g$ $g$, which may be movable, to permit the rearward or forward adjustment of the shovel with the standard, and which is clipped to the arms of the hounds or to the side pieces of the frame A, as seen at $h$ $h$. To hold the standard as against the resistance of the earth while its shovel is forming the furrow for the dropping seed from the hopper it is chained, as at $i$, or otherwise suitably connected to the tongue E of the frame or hounds.

F F are the rear shovels for covering up the planted seed, with their standards F' F' connected to beams G, preferably linked or loosely connected at their forward ends to the pendants $a$, while their rear ends are linked, as at $j$, to the same end of a lever, H, which is pivoted at its forward end to a second lever, I, supported upon the rear connecting-piece, $k$, of the hounds or frame A, and pivoted in a slotted upright, $l$, or other convenient support, fastened to other cross-pieces, $m$, of the frame or hounds, as clearly seen in Fig. 1.

J is a hand-lever, pivoted, near or a short distance from its forward end, between the upper ends of the slotted upright $l$, with said end connected, by a chain, $n$, or other suitable means, to the standard of the front plow, and its rear end extending back to the rear end of the planter, within easy reach of the attendant, and is adapted to be held when depressed by a barbed upright or hook, o, fastened upon the lever H. This lever J has a guide-rod, p, attached to it, which extends down through, and is confined in its movement by a staple or eye, q, driven into the bolster r of the axle.

K K are parallel bars or a single piece constituting another lever, whose rear end is linked, as at s, to the lever H, and is provided a short distance therefrom with a friction-roll, t, resting or moving upon the lever I, while its forward end is forked, so as to extend on each side of and past the lever J, and provided with a friction-roll, u, upon which the lever J bears or rests, all as fully seen in Figs. 1 and 5.

It will be seen that as downward force is applied to the rear end of the lever J it will lift the forward plow from the ground, and simultaneously, through the intermediate system of levers, also elevate the rear plows, all in a quick or expeditious manner, with but little power.

Having thus fully described my invention, I claim and desire to secure by Letters Patent of the United States—

In a planter for cotton, &c., with a seed drum or hopper and its driving mechanism, the combination, with its shovel-standards, of the lever J, connected to the forward shovel or plow-standard, and the system of levers H I K, connecting the lever J to the rear plow-standards or to their beams, substantially as and for the purpose specified.

COULMON W. WILLCOXSON.

Witnesses:
H. D. MARKHAM,
H. B. SULLIVAN.